Patented Feb. 23, 1954

2,670,361

UNITED STATES PATENT OFFICE 2,670,361

POLYMERIZATION PROCESS USING HYDROGEN FLUORIDE

Clarence Bradford Croston, Howard M. Teeter, and John C. Cowan, Peoria, Ill., assignors to the United States of America as represented by the Secretary of Agriculture No Drawing. Application November 9, 1951, Serial No. 255,723

5 Claims. (Cl. 260—407)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the polymerization of long chain unsaturated fatty acids or their lower alkyl esters, and more particularly to the polymerization of the fatty acids derived from drying or semi-drying glyceride oils, such as soybean oil, corn oil, perilla oil, sunflower seed oil, peanut oil, linseed oil, tung oil and the like.

The invention is based upon the discovery that hydrogen fluoride, under certain critically controlled conditions, as will be hereinafter disclosed in detail, facilitates the polymerization of these fatty acids or their esters with many attendant economic and technological advantages. For example, the polymerizate produced by the process of the invention possesses a ratio of dimeric polymer to trimer which is relatively low compared with prior products of non-catalytic polymerization, while, at the same time, containing less products of decomposition and color bodies. Moreover, the polymerization process alters the acid number of the substances a remarkably small amount and the free acids can thus be polymerized directly, avoiding the customary procedure of converting the acids to their alkyl esters for polymerization followed by saponification of the polymerizate. Furthermore, the inventive process permits employment of considerably reduced times and temperatures in the polymerization step.

According to the invention a fatty acid material derived from a drying or semi-drying glyceride oil, such as soybean oil, corn oil, perilla oil, sunflowerseed oil, peanut oil, linseed oil, tung oil, and the like, and selected from the group consisting of long chain, unsaturated, aliphatic carboxylic acids, preferably linoleic acid, the lower alkyl esters of these acids, such as the methyl, ethyl, and propyl esters, preferably methyl linoleate, and mixtures of such acids and esters, is subjected to the action of hydrogen fluoride in an amount of from 15% to 65%, based on the weight of the fatty acid material, at a temperature of from 15° C. to 100° C. until polymerization is effected, which occurs in a period of from 1 to 5 hours. The lower temperatures require times of from 3 to 5 hours while at temperatures above about 50° C., only 1 to 3 hours are required for satisfactory polymerization, pressures above atmospheric being required at the higher temperatures.

At the expiration of the polymerization time, the polymerizate is separated from the hydrogen fluoride and may be used directly. It may be used for any of the known purposes familiar to the skilled chemist, for polymerized fat acids. One use to which it is particularly amenable is in conjunction with hydrocarbon road surfacing mixtures in the making of roads.

The following examples are illustrative of the invention:

Example 1

One hundred grams linoleic acid and 35 grams hydrogen fluoride were heated at 85°–95° C. for one hour in a sealed steel bomb. The product was mixed with water, extracted into hexane, and the hexane layer washed with water until free of acid. The hexane layer was dried over sodium sulfate and the solvent removed by heating. The more volatile components were then removed by distillation at temperatures up to 250° C. at pressures of 0.1 to 0.2 mm.

Example 2

The procedure of Example 1 was followed using 100 grams methyl linoleate instead of the linoleic acid.

Example 3

The procedure of Example 1 was followed using 100 grams of the free fatty acids from soybean oil.

Example 4

One hundred grams of the methyl esters of the mixed acids from soybean oil and 35 grams hydrogen fluoride were heated at 80°–90° C. following the procedure in Example 1.

Example 5

Example 1 was repeated using 100 parts by weight of mixed acids from soybean oil and 40 parts by weight of hydrogen fluoride. The temperature of reaction was 81°–92° C. The characteristics of the products of the foregoing examples are summarized in the following table.

TABLE

| Example No. | Polymer Yield, percent | Refractive Index (30°) | Acid No. | Color (Gardner) |
|---|---|---|---|---|
| 1 | 94 | 1.4925 | 157 | 15 |
| 2 | 93 | 1.4834 | 10.5 | 13–14 |
| 3 | 72 | 1.495 | 170 | 17–18 |
| 4 | 71 | 1.4825 | 4.2 | 14 |
| 5 | 79 | | 124 | |

We claim:

1. A process comprising subjecting a fatty acid material derived from drying and semi-drying glyceride oils and selected from the group consisting of a long-chain, unsaturated, aliphatic carboxylic acid, a lower alkyl ester thereof, and mixtures of such acids and esters, to the action of a polymerization agent consisting essentially of hydrogen fluoride at a temperature of from 15° C. to 100° C. until polymerization is effected, said hydrogen fluoride being present in an amount of from 15% to 65% based on the weight of the fatty acid material.

2. The process of claim 1 wherein the fatty acid material is a long-chain, unsaturated, aliphatic carboxylic acid.

3. The process of claim 1 wherein the fatty acid material is linoleic acid.

4. The process of claim 1 wherein the fatty acid material is a lower alkyl ester of a long-chain, unsaturated, aliphatic carboxylic acid.

5. The process of claim 1 wherein the fatty acid material is methyl linoleate.

CLARENCE BRADFORD CROSTON.
HOWARD M. TEETER.
JOHN C. COWAN.

References Cited in the file of this patent

UNITED STATES PATENTS

| Number | Name | Date |
|---|---|---|
| 2,260,417 | Whiteley et al. | Oct. 28, 1941 |
| 2,478,451 | Berger et al. | Aug. 9, 1949 |